United States Patent [19]
Chassaigne

[11] 4,015,042
[45] Mar. 29, 1977

[54] MATERIALS FOR MAGNETIC RECORDING HAVING HIGH RESISTANCE TO WEAR AND REDUCED ABRASION ON MAGNETIC HEADS

[75] Inventor: Yves Gilbert Chassaigne, Paris, France

[73] Assignee: Eastman Kodak Company, Rochester, N.Y.

[22] Filed: Dec. 23, 1974

[21] Appl. No.: 535,755

[30] Foreign Application Priority Data

Dec. 28, 1973 France .............................. 73.46716

[52] U.S. Cl. ................................ 428/325; 428/328; 428/329; 428/331; 428/404; 428/900
[51] Int. Cl.² .......................................... B32B 5/16
[58] Field of Search .......... 428/325, 328, 329, 331, 428/404, 900, 323, 402; 252/62.54; 427/128, 131

[56] References Cited
UNITED STATES PATENTS

| | | | |
|---|---|---|---|
| 3,190,197 | 6/1965 | Pinder | 428/331 |
| 3,622,386 | 11/1971 | Larsen | 427/128 |
| 3,687,725 | 8/1972 | Hartmann et al. | 428/329 |
| 3,833,412 | 9/1974 | Akashi et al. | 428/900 |
| 3,843,404 | 10/1974 | Haefele et al. | 428/900 |

FOREIGN PATENTS OR APPLICATIONS

1,287,633 1/1969 Germany .......................... 427/128

OTHER PUBLICATIONS

Friedman et al., "Lubricants for Magnetic Recording Media," IBM Tech. Disclosure Bulletin, vol. 9, No. 7, p. 779, Dec. 1966.
The Condensed Chemical Dictionary, 5th Ed., Reinhold Publishing Corp., N.Y., 1956, pp. 1060 and 1061.

*Primary Examiner*—Marion E. McCamish
*Attorney, Agent, or Firm*—B. D. Wiese

[57] ABSTRACT

Magnetic recording elements comprising a magnetic layer containing dispersed particles which improve the wear resistance of the layer are disclosed. Such elements comprise a non-magnetic support and a magnetic recording layer that contains dispersed in a binder, ferromagnetic particles for recording and non-ferromagnetic particles of different average particle size. These non-ferromagnetic particles of different particle size have a Mohs Hardness above that of the ferromagnetic particles. These non-ferromagnetic particles consist essentially of (a) particles having an average particle size similar to or larger than that of the ferromagnetic particles, of about 0.3 to about 2 microns, present at a concentration of about 0.005 to about 0.025 parts, by weight, based on the weight of the ferromagnetic particles, and (b) smaller particles having an average particle size up to about 0.1 micron, present at a concentration of about 0.02 to about 0.06 parts, by weight, based on the weight of the ferromagnetic particles. Suitable ferromagnetic particles include acicular iron oxides, chromium dioxide and the like. The magnetic recording elements disclosed herein, particularly the magnetic tapes, exhibit high resistance to wear and tear and low abrasiveness.

19 Claims, No Drawings

MATERIALS FOR MAGNETIC RECORDING HAVING HIGH RESISTANCE TO WEAR AND REDUCED ABRASION ON MAGNETIC HEADS

BACKGROUND OF THE INVENTION

The present invention relates to a material for magnetic recording. In one aspect, this invention relates to a magnetic tape having a great resistance to wear and tear without undesirable abrasiveness on recording and reading heads. In another aspect, this invention relates to using non-ferromagnetic particles of different average particle size in magnetic recording layers to improve the resistance to wear and tear of the layers without deleteriously increasing the abrasiveness of the layers.

DESCRIPTION OF THE PRIOR ART

It is known that magnetic recording elements are generally made up of a non-magnetizable support coated with one or more layers of magnetizable particles dispersed in a binder, e.g. a synthetic resin binder. Such elements can be in a flexible or rigid form, as for example tapes, discs, drums, and the like. It is also known that such magnetic recording elements generally pass, in recording and reading operations, in front of magnetic heads, and establish a physical contact between at least one magnetic recording layer and the magnetic head. This results in friction that may cause a more or less substantial alteration of the magnetic layer. A frequently observed result of this friction is a stripping of material which accumulates on the head or heads. Such material is often carried back onto the surface of the magnetic material and causes recording and reading defects by bringing about the weakening or even the disappearance of the signal.

The aforementioned problems are particularly noticeable in the case of materials used for magnetic recordings serving as storage elements in data processing equipment and magnetic tapes designed for the recording of images. This is due to the relatively high speed between the heads and the magnetic layer and the particular requirements connected with these types of use. In the magnetic recordings of images, the large number of information bits to be recorded per time unit requires the use of very short wavelengths (generally about 1 to 6 microns) and recording and reading at high speed. This requires, for example, the use of rather thin magnetic layers, magnetic tapes having good flatness and a smooth surface so as to assure intimate physical contact with the recording and reading heads and high head-to-magnetic tape relative speeds.

Various means have been suggested for increasing the wear resistance of magnetic recording elements and, in particular, for preventing the stripping of the magnetic material and its deposition on the heads. For example, such suggestions include the use of cross-linked binders in magnetic layers, and the use of lubricants, such as fatty acid esters, such as described in French Pat. Nos. 1,457,106 and 1,561,251 and mixed esters of carbonic acid such as ethyl cetyl carbonate, as described in French Pat. No. 2,094,663.

Lubricants such as described in the above-mentioned patents, make it possible to obtain magnetic tapes having very satisfactory wear resistance, particularly when these magnetic tapes employ magnetic pigments of larger particle size, e.g. iron or chromium oxides having an average size in the range of about 0.8 to about 1.2 microns. However, the problems of wear resistance are more complicated with the now widespread use of magnetic pigments of smaller particle size, e.g. iron oxides having an average size of about 0.3 to about 0.7 micron. This is due to the fact that with the same magnetic composition, the wear resistance of the tape decreases when one uses oxides with higher acicularity and smaller average sizes. Also, the use of shorter and shorter wavelengths in the recording of images requires magnetic tapes displaying a very good surface condition, i.e., a very flat or smooth surface. However, it has been noted that an improvement in the surface condition of the tape generally decreases its resistance to wear.

It has also been suggested, particularly in the case of magnetic materials submitted to high exploring speeds, that very hard substances could be incorporated into the magnetic layer in order to increase its wear resistance. Suitable substances include e.g. alumina having an average particle size above the size of the ferromagnetic particles that are used for recording. Such magnetic tapes displaying improved resistance to wear and tear are described in French Pat. Nos. 2,021,243 and 2,096,031. However, this mode of operation causes a substantial increase in the abrasiveness of the magnetic tapes and causes extremely high wear on the heads. Since magnetic heads have a complex structure, and are very expensive, it is desirable to have at one's disposal magnetic recording elements exhibiting substantially reduced wear of the recording and reading magnetic heads.

SUMMARY OF THE INVENTION

The magnetic recording elements of this invention comprise a non-magnetic support and a magnetic recording layer having dispersed in a binder, (1) ferromagnetic particles and (2) non-ferromagnetic particles that improve the wear resistance of the layer and have a Mohs Hardness above that of the ferromagnetic particles. Suitable non-ferromagnetic particles consist essentially of (a) particles having an average particle size similar to or larger than that of the ferromagnetic particles in the range of about 0.3 to about 2 microns that are present in the magnetic recording layer in a concentration in the range of about 0.005 to about 0.025 parts, by weight, based on the weight of ferromagnetic particles and (b) particles having an average particle size up to about 0.1 micron that are present in a concentration in the range of about 0.02 to about 0.06 parts by weight, based on the weight of ferromagnetic particles.

The magnetic recording elements of this invention can be prepared in any suitable manner. One such process comprises incorporating the (a) and (b) particles, as described, into a previously prepared dispersion of ferromagnetic particles (which can contain additives) in a binder or a mixture of binders, applying the dispersion as an external layer over a non-magnetic support, and then drying the layer. If necessary, the layer can be treated, e.g. by surface treatments such as polishing, to improve its surface condition. The magnetic recording elements prepared according to this process can contain one or more magnetic recording layers, as described herein. In elements containing at least two such layers the combination of (a) and (b) particles is generally employed in the outermost magnetic recording layer, with respect to the non-magnetic support in the element. However, the combination of particles can, of course, be used in one or more of the magnetic recording layers in a magnetic recording element.

As previously indicated, the non-ferromagnetic particles selected for use in the practice of this invention have a Mohs Hardness which is greater than that of the ferromagnetic particles employed in the magnetic recording layers with these non-ferromagnetic particles. The Mohs Hardness Scale is a system in which solid substances are classified in order of increasing hardness so that the hardness of any particular substance will be expressed by a number. The numbers of this system have been established by assigning the integers from 1 to 10 to arbitrarily chosen substances of increasing hardness ranging from talc, which is given the number 1, to diamond, which is given the number 10. The hardness of any substance not on the scale is determined by the scratch test, i.e., by comparing its hardness with that of the various substances in the standard scale utilizing the principle that the harder of the two substances will scratch the softer one and will not be scratched by it. When a substance is found to have a hardness between two of the standard substances of the scale, this fact is expressed by use of a decimal notation. The Mohs Hardness Scale referred to herein can be found in Lange's Handbook of Chemistry, 8th edition, Handbook Publishers, Inc., at p. 132.

The addition of the very fine abrasive particles, i.e., the (b) particles, to a dispersion of magnetic particles containing larger abrasive (a) particles, makes it possible to obtain a magnetic tape exhibiting lower abrasiveness combined with very good resistance to wear and tear. In contrast, the same magnetic dispersion containing a small quantity of only abrasive (a) particles, yields a tape displaying a suitable abrasiveness but insufficient and unacceptable resistance to wear and tear. According to this invention, the addition of very fine abrasive (b) particles, in the concentrations described herein, makes it possible to obtain a magnetic recording elemen displaying substantially improved resistance to wear and tear without the substantial increase in abrasiveness generally associated with the use of the larger (a) particles in magnetic recording layers. In addition, the magnetic tapes of this invention display a very smooth surface.

In the past, it was only possible to obtain magnetic tapes with a suitable wear resistance by the incorporation of a rather high concentration of rather large abrasive particles. For example, as described in French Pat. No. 2,021,243, the concentration of larger (a) particles generally goes up to 0.06 by weight, based on the weight of the ferromagnetic particles, which influences the abrasion characteristics of the resulting tape in an undesirable manner. By the practice of this invention, the concentration of these large abrasive particles can be substantially decreased to obtain a magnetic tape which combines suitable resistance to wear and tear with a more acceptable abrasiveness.

As one feature of this invention, it should be noted that the addition of only very fine abrasive (b) particles to a magnetic recording layer, for example, in a concentration in the range of about 0.04 to about 0.08 parts, by weight, with respect to the weight of the ferromagnetic particles, has been found to give no significant improvement in resistance to wear.

DESCRIPTION OF PREFERRED EMBODIMENTS

As indicated previously, the non-ferromagnetic (a) and (b) particles employed in this invention have a Moh Hardness above that of the ferromagnetic particles in the magnetic recording layer. The Mohs Hardness of these non-ferromagnetic (a) and (b) particles is generally about 5.5 to about 10, desirably about 6 to about 9.5 and preferably about 7 to about 9.3. Preferred non-ferromagnetic particles are alumina particles having a Mohs Hardness of about 9, although other suitable non-ferromagnetic particles include silicon, silicon carbide, silicon nitride, boron carbide, boron nitride and chromium (III) oxide particles. The (a) particles generally have an average particle size in the range of about 0.3 to about 2 microns, preferably about 0.3 to about 0.8 micron. The size of these particles is generally similar to or larger than the average particle size of ferromagnetic particles with which they are used in this invention. In contrast, the (b) particles are of colloidal size and generally have an average particle size up to about 0.1 micron, generally about 0.001 to about 0.1 micron and preferably about 0.01 micron to about 0.05 micron. The concentration of (a) particles employed in the practice of this invention is generally in the range of about 0.005 to about 0.025, preferably about 0.01 to about 0.02 parts, by weight, based on the weight of the ferromagnetic particles in the magnetic recording layer. The concentration of (b) particles is generally in the range of about 0.02 to about 0.06, preferably about 0.02 to about 0.04 parts, by weight, based on the weight of the ferromagnetic particles. Any suitable sieving or grading operation, many of which are well known in the art, can be used to provide particles having the desired average particle size described herein.

In practicing this invention, a preferred magnetic recording layer, which can be the outermost magnetic recording layer in the case of a multi-ferromagnetic-layer recording element, contains (a) particles of alumina having an average particle size in the range of about 0.3 to about 0.8 micron at a concentration in the range of about 0.01 to about 0.02 parts by weight, based on the weight of the ferromagnetic particles, and (b) particles of colloidal alumina having an average particle size in the range of about 0.01 to about 0.05 micron at a concentration in the range of about 0.02 to about 0.04 parts, by weight, based on the weight of ferromagnetic particles.

The ferromagnetic material employed in the practice of this invention is preferably a fine grain magnetic material, e.g. ferromagnetic particles such as magnetic oxides, having an average particle size of about 0.3 to about 0.7 micron. However, suitable ferromagnetic particles include those having average particle sizes in the range of about 0.3 to about 1.2 microns. Cubic or acicular iron oxide ferromagnetic particles, particularly acicular gamma ferric oxides or acicular ferrous ferric oxides can be employed in the practice of this invention. Such particles may be doped with one or more metal ions of a polyvalent metal such as cobalt, nickel, chromium, zinc, manganese or the like. A particularly desirable material is acicular gamma ferric oxide or ferrous ferric oxide having an acicularity ratio above 4 or 5 and preferably 15 or more. Additional suitable ferromagnetic particles include chromium dioxide, ferrites, alloys such as iron alloys, and the like.

Binding agents which can be used to disperse the ferromagnetic and non-ferromagnetic particles employed in this invention include any of the binders well known for the manufacture of magnetic layers. Typical binders are polymeric binding agents such as copolymers of vinyl acetate with vinyl chloride, copolymers or vinylidene chloride with acrylonitrile, copolymers of acrylic and/or methacrylic esters, polyvinyl butyral, copolymers of butadiene with styrene, terpolymers of acrylonitrile, vinylidene chloride and maleic anhydride, crosslinked or noncrosslinked homopolymers or copolymers such as polyamides, polyurethanes, polyesters and the like, as well as mixtures of these binders. Particularly good results can be obtained with a copolymer of vinyl acetate with vinyl chloride, partially hydrolyzed, and possibly crosslinked by an isocyanate, or by using polyurethanes, or a mixture of these binders. The amount of binder employed with respect to the magnetic material, is generally in the range of about 10% to about 40%, by weight, and preferably from about 10% to about 25%, by weight.

The magnetic recording layer according to the invention can also contain other additives including those well known to the expert in the field. Typical additivies are plasticizers such as epoxidized fatty acid esters, as described in French Pat. No. 2,058,419, dispersing agents such as oleic or stearic acid and the like. Preferably, the magnetic recording layer contains a lubricating agent, particularly a mixed ester of a carbonic acid, such as the ethyl cetyl carbonate, as described in French Pat. No. 2,094,663.

As previously indicated, the elements of this invention can be prepared by incorporating into the magnetic composition, or at least into the magnetic composition forming the outermost recording layer in a multi-layer material, non-ferromagnetic (a) and (b) particles, at concentrations based on the weight of the ferromagnetic particles, all as previously described. The non-ferromagnetic particles can be added at any stage in the preparation of the magnetic composition and before its application to the support. For example, a mixture of (a) and (b) non-ferromagnetic powders can be added to the magnetic dispersion at the beginning of the preparation. It is also possible to separately prepare a dispersion of a mixture of non-ferromagnetic particles with a binder and a solvent and then add this mixture to the magnetic dispersion during its preparation or just before its application to the support.

Suitable solvents that can be employed in the preparation of magnetic dispersions in the practice of this invention include organic materials such as methyl ethyl ketone, methyl isobutyl ketone, ethyl acetate, butyl acetate, cyclohexanone and the like, as well as mixtures thereof.

According to one embodiment of the invention, the final magnetic dispersion containing a suitable bimodal distribution of non-ferromagnetic (a) and (b) particles is applied directly to a support, particularly a flexible support such as polyethylene terephthalate, by one of the known processes. After the magnetic recording layer is dry, the surface of the deposited layer is smoothed, e.g., by calendering. According to another embodiment of the invention, a magnetic dispersion containing, the non-ferromagnetic (a) and (b) particles is applied over a magnetic recording layer previously coated on a support. According to still another embodiment, an external layer of a magnetic dispersion containing non-ferromagnetic (a) and (b) particles is applied simultaneously with another magnetic dispersion to form two superimposed magnetic recording layers upon a single support. Typically, one may use the process described in French Pat. No. 7,206,203.

A wide variety of non-magnetizable supports can be used in the elements of this invention. Suitable flexible supports include polyester films, for example, polyethylene terephthalate film, polycarbonate film, cellulose acetate film, polyvinyl chloride film and the like. Rigid supports, such as plates or discs can also be employed.

In the following Examples, the wear resistance of the magnetic recording element was measured using helicoidal type equipment. Such equipment is currently used in magnetic recording and reproduction of images in closed circuit television transmissions, for example in school transmissions, and offers the possibility of reading a stationary image. In such case, the tape advance is stopped and the magnetic head continues its exploration. In the system used, the head continued to turn at 3,000 rpm and constantly ran the same line of data. Under those conditions, a small area of the tape was submitted to wear action corresponding to 3,000 passages per minute. In this way it was possible to record the wear resistance of the magnetic element by determining the time which the image remained present on the television receiver. A grading system of from 0 to 5, called the "wear mark," made it possible to classify the elements as a function of time:

0 = wear in less than 1 minute
1 = wear between 1 and 3 minutes
2 = wear between 3 and 8 minutes
3 = wear between 8 and 30 minutes
4 = wear between 30 minutes and 1 hour
5 = resistance above 1 hour.

In the following Examples, the surface condition of a magnetic recording element is expressed in "percentage of contact area." As previously indicated, a smooth surface is essential for obtaining good recording at high frequencies. This "percentage of contact area" is determined with relation to a reference surface consisting of the hypotenuse surface of a prism with total reflection. The value of an incident luminous flux is equal to $\phi$. The flux reflected by the hypotenuse surface is equal to $\phi$ and becomes equal to $\phi'$ when one places, under pressure, a sample of a magnetic element against the surface with the magnetic layer of the element in contact with the surface. The "percentage of contact area" is equal to $$\frac{\phi - \phi'}{\phi} \times 100.$$

. The value of the "percentage of contact area" increases with the flatness of the surface of the magnetic element, i.e., with the surface smoothness of the element. For magnetic tape comprising fine grain oxides in the recording layer the "percentage of contact area" is advantageously at least 70%.

The following Examples illustrate the practice of this invention. In these Examples, the parts are, unless otherwise indicated, expressed as parts by weight.

EXAMPLE 1

A magnetic dispersion in methyl isobutyl ketone having the following composition was prepared in a ball mill.

Acicular gamma $Fe_2O_3$ (average size (length)

-continued

| | |
|---|---|
| of particles 0.5 micron) | 1000 parts |
| Rhodapas AXRH* | 250 parts |
| Ecepox PB II** | 25 parts |
| Ethyl and cetyl carbonate (lubricant) | 40 parts |
| Alumina (average particle size 0.3 micron) | 10 parts |

*Rhodapas AXRH is the trade name for a partially hydrolyzed copolymer of vinyl acetate with vinyl chloride sold by Rhone-Poulenc
**Ecepox PB II is the trade name for an octyl epoxy-stearate sold by Ugine-Kulmann The dispersion was coated on a polyethylene terephthalate support to form a layer 4 to 12 microns thick, in the dry state. After drying, calendering and cutting, there is obtained a magnetic tape (Sample A) which serves as a control sample.

A second magnetic dispersion was prepared as above, except that it also contained 30 parts by weight of colloidal alumina having an average particle size of about 0.03 micron. The colloidal alumina used is available under the commercial name ALON from the Cabot Corporation. The dispersion was coated on a non-magnetizable polyethylene terephthalate support in the same manner as previously described to obtain a magnetic tape (Sample A-1).

A magnetic dispersion having the same composition used in Sample A, but also containing 60 parts, by weight, of Alon was prepared. The dispersion was coated in the same manner as previously described to form a sample of magnetic tape (Sample A-2).

The "wear mark" and "percentage of contact area," were determined on each of the 3 samples using the previously indicated methods. Table I below sets forth the results obtained.

Table I

| Sample | Parts by weight of Alumina (0.3 micron) | Parts by weight of Alumina (0.03 micron) | Percentage of Contact Area | Wear Mark |
|---|---|---|---|---|
| A | 10 | 0 | 79 | 3 |
| A-1 | 10 | 30 | 83 | 5 |
| A-2 | 10 | 60 | 81 | 5 |

It can be seen from the table that the addition of alumina having an average particle size of 0.03 micron substantially increases the wear resistance of the magnetic recording layer, this resistance being raised from an average of 20 minutes (wear mark 3) for Sample A to over one hour (wear mark 5) for Samples A-1 and A-2 without any substantial deleterious effect upon the quality of the image. Furthermore, the improvement in wear resistance was obtained without deterioration of the surface condition of the magnetic tape, as shown by the "percentage of contact area" reported. In addition, these improvements were attained without substantial deterioration of the magnetic heads.

EXAMPLE 2

A magnetic dispersion in methyl isobutyl ketone having the following composition was prepared in a ball mill.

| | |
|---|---|
| Acicular gamma Fe₂O₃ (average size (length) of particles 0.6 micron) | 1000 parts |
| Rhodopas AXRH | 250 parts |
| Ethyl cetyl carbonate lubricant | 40 parts |
| Inipol 002* | 40 parts |

-continued

| | |
|---|---|
| Alumina (average particle size 0.5 micron) | 5 parts |

*Inipol 002 is the trade name for a dioleate of oleoylaminopropyleneamine available commercially from Pierrefitte Auby.

Using the procedure of Example 1, a sample of magnetic tape was prepared (Control sample B).

Two other magnetic dispersions having the above composition, except that the first contained, in addition, 20 parts of alumina having an average particle size of 0.03 micron and the second contained 40 parts of such alumina. After coating, drying and calendering there was obtained two samples of magnetic tape (Samples B-1 and B-2).

Another magnetic dispersion having the above composition but containing 10 parts of the alumina in particles of average size of 0.5 micron, instead of 5 parts, was prepared.

A sample of magnetic tape was prepared from this dispersion using the procedure described previously (Control sample C).

Two other magnetic dispersions having the above composition but comprising 10 parts of alumina having an average particle size of 0.5 micron and 20 parts and 40 parts respectively of alumina having an average particle size of 0.03 micron was prepared. Two samples of magnetic tape were prepared from these dispersions (Samples C-1 and C-2 respectively).

The "wear mark" and "percentage of contact area" were determined for each of these six samples using the previously indicated methods. The following Table II sets forth the results obtained.

Table II

| Sample | Parts by Weight of Alumina (0.5 micron) | Parts by Weight of Alumina (0.03 micron) | Percentage of Contact Area | Wear Mark |
|---|---|---|---|---|
| B | 5 | 0 | 65 | 3 |
| B-1 | 5 | 20 | 70 | 3 |
| B-2 | 5 | 40 | 69 | 5 |
| C | 10 | 0 | 64 | 3 |
| C-1 | 10 | 20 | 68 | 5 |
| C-2 | 10 | 40 | 72 | 5 |

As in Example 1, it can be seen that the smaller alumina particles can be added to increase the wear resistance of the tapes. The concentration of the smaller alumina particles used to obtain a wear resistance above one hour (wear mark 5) is higher for sample B, which contains less alumina in particles of average dimensions of 0.5 micron, than for the sample C. The improved wear resistance is obtained without deleterious deterioration of the surface condition of the magnetic tapes and without any substantial decrease in the quality of the image.

EXAMPLE 3

A magnetic dispersion of methyl isobutyl ketone having the following composition was prepared in a ball mill.

| | |
|---|---|
| Acicular gamma Fe₂O₃ (Average size (length) of particles 0.6 micron) | 100 parts |
| Rhodapas AXRH | 25 parts |
| Ecepox PB II | 4 parts |
| Alumina (average particle size | |

-continued

| | |
|---|---|
| of 0.3 micron) | 2 parts |

Using the procedure of Example 1, a sample of magnetic tape (Sample D) was prepared.

Two other magnetic dispersions having the above composition, except that the first contained 4 parts of alumina having an average particle size of 0.03 micron, and the second contained 6 parts of such alumina, were prepared. After coating these dispersions as in Example 1 two samples of magnetic tape (Samples D-1 and D-2) were obtained.

The "wear mark" and the "percentage of contact area" were determined according to the previously indicated methods. The following Table III sets forth the results obtained.

Table III

| Sample | Parts by weight of Alumina (0.3 micron) | Parts by weight of Alumina (0.03 micron) | Percentage of Contact Area | Wear Mark |
|---|---|---|---|---|
| D | 2 | 0 | 78 | 1 |
| D-1 | 2 | 4 | 80 | 2 |
| D-2 | 2 | 6 | 78 | 3 |

As can be seen from the table, the addition of smaller alumina particles increases the wear resistance from 1 minute (wear mark 1) for sample D to 5 minutes (wear mark 2) for test samples D-1, and 15 minutes (wear mark 3) for sample D-2. This increase was obtained without the quality of the image being deleteriously affected in a noticeable manner and without substantial deterioration of the magnetic heads.

Similar improvements in wear resistance and abrasion can be expected when other non-ferromagnetic particles such as silicon carbide, boron carbide and chromium (III) oxide having the required Mohs Hardness and particle size described herein, are substituted for alumina particles in the above procedure.

In contrast to the above results, it should be noted that the use of alumina particles having an average particle size of 0.3 micron in place of particles having an average particle size of 0.03 micron gives no substantial improvement in wear resistance over the use alone of the alumina particles having a 0.6 micron average size. Furthermore, such a particle combination is much more abrasive than the combination of particles employed in the practice of this invention.

EXAMPLE 4

A magnetic dispersion in methyl isobutyl ketone having the following composition was prepared in a ball mill

| | |
|---|---|
| Acicular gamma $Fe_2O_3$ (average size (length) of particles 0.5 micron) | 100 parts |
| Rhodopas AXRH | 15 parts |
| Novolac* | 10 parts |
| Ethyl cetyl carbonate | 4 parts |
| Inipol 002 | 3 parts |
| Alumina (average particle size of 0.3 micron) | 1 part |

*Novolac is a trade name for a phenol-aldehyde resin available commercially from Ugine-Kulmann.

This dispersion was used to prepare a sample of magnetic tape (Sample E) using the procedure of Example 1.

Another dispersion having the above composition, but also containing 4 parts of alumina having an average particle size of 0.03 micron was prepared. Using the procedure of Example 1, a sample of magnetic tape (Sample E) was prepared.

The "wear mark" and "percentage of contact area" for these samples were determined according to the previously indicated methods. The following Table IV sets forth the results.

Table IV

| Sample | Parts by weight of Alumina (0.3 micron) | Parts by weight of Alumina (0.03 micron) | Percentage of Contact Area | Wear Mark |
|---|---|---|---|---|
| E | 1 | 0 | 69 | 2 |
| E-1 | 1 | 4 | 67 | 5 |

It was noted that the addition of the smaller alumina particles substantially increased the wear resistance from 5 minutes (wear mark 2) to over one hour (wear mark 5) without the quality of the image being substantially deleteriously affected and without substantial deterioration of the magnetic heads.

EXAMPLE 5

A magnetic dispersion in methyl isobutyl ketone having the following composition was prepared in a ball mill.

| | |
|---|---|
| Acicular gamma $Fe_2O_3$ (average size (length) of particles 0.5 micron) | 100 parts |
| Antaron V 516* | 10 parts |
| Rhenoflex** | 15 parts |
| Ethyl cetyl carbonate | 4 parts |
| Ecepox PB II | 4 parts |
| Alumina (average particle size of 0.5 micron) | 1 part |

*Antaron V 516 is the trade name for a modified polyvinyl pyrrolidone available commercially from GAF Corp.
**Rhenoflex is the trade name for a polyvinyl chloride, available commercially from Dynamit Novel Chemikalien.

A sample of magnetic tape (Sample F) was prepared using the procedure of Example 1.

Another magnetic dispersion having the above composition but also containing 4 parts by weight of alumina having an average particle size of 0.03 micron was prepared. Using the procedure of Example 1, a sample of magnetic tape (sample F-1) was prepared.

The "wear mark" and the "percentage of contact area" was determined for these samples. The following Table V sets forth the results.

Table V

| Sample | Parts by weight of Alumina (0.5 micron) | Parts by weight of Alumina (0.03 micron) | Percentage of Contact area | Wear Mark |
|---|---|---|---|---|
| F | 1 | 0 | 80 | 2 |
| F-1 | 1 | 4 | 80 | 5 |

The addition of colloidal size alumina particles increased the wear resistance from 5 minutes (wear mark 2) for Sample F to over 1 hour (wear mark 5) for Sample F-1 without the quality of the image being deleteriously affected in a substantial manner and without substantial deterioration of the magnetic heads.

EXAMPLE 6

A magnetic dispersion in methyl isobutyl ketone having the following composition was prepared in a ball mill.

| | |
|---|---|
| Acicular gamma Fe₂O₃ (average size (length) of particle 0.6 micron) | 100 parts |
| Butvar V 76* | 25 parts |
| Ecepox PB II | 4 parts |
| Ethyl cetyl carbonate | 4 parts |
| Alumina (average particle size of 0.3 micron) | 1 part |

*Butvar V 76 is the trade name of a copolymer of vinyl butyral with vinyl alcohol available commercially from Shawinigan Resins Co.

Using the procedure of Example 1, a sample of magnetic tape (Sample G) was prepared.

Another magnetic dispersion having the above composition but also containing 4 parts by weight of alumina having an average particle size of 0.03 micron was prepared. A sample of magnetic tape (Sample G-1) was prepared as in Example 1. The "wear mark" and the "percentage of contact area" were determined for these samples. The following Table VI sets forth the results.

Table VI

| Sample | Parts by weight of Alumina (0.3 micron) | Parts by weight of Alumina (0.03 micron) | Percentage of Contact Area | Wear Mark |
|---|---|---|---|---|
| G | 1 | 0 | 83 | 1 |
| G-1 | 1 | 4 | 75 | 4 |

The addition of the colloidal alumina particles increased the wear resistance from 2 minutes (wear mark 1) from sample G to 1 hour (wear mark 4) for sample G-1 without downgrading the quality of the image and without appreciable deterioration of the magnetic heads.

Similar improvements in wear resistance and abrasion can be expected when non-ferromagnetic particles having the required Mohs Hardness and particle size, e.g. silicon, silicon nitride, or boron nitride particles, are substituted for the alumina particles in the above procedure.

EXAMPLE 7

A magnetic dispersion in methyl isobutyl ketone having the following composition and containing silicon carbide having an average particle size of 2 microns was prepared in a ball mill.

| | |
|---|---|
| Acicular gamma Fe₂O₃ (average size (length) of particles 0.5 micron) | 1000 parts |
| Rhodopas AXRH | 250 parts |
| Ethyl cetyl carbonate | 40 parts |
| Ecepox PB II | 25 parts |
| Silicon carbide (average particle size of 2 microns) | 10 parts |

A sample of magnetic tape (Sample H) is prepared as in Example 1.

Another magnetic dispersion having the above composition but also containing 40 parts, by weight, of alumina having an average particle size of 0.03 micron is prepared as above. A sample of magnetic tape (Sample H-1) was prepared using the procedure of Example 1. The "wear mark" and the "percentage of contact area was determined. The following Table VII sets forth the results.

Table VII

| Sample | Parts by weight Silicon Carbide (2 microns) | Parts by weight of Alumina (0.03 micron) | Percentage of Contact Area | Wear Mark |
|---|---|---|---|---|
| H | 10 | 0 | 63 | 2 |
| H-1 | 10 | 40 | 70 | 4 |

The addition of the alumina particles increased the wear resistance from an average of 5 minutes (wear mark 2) for Sample H to 50 minutes (wear mark 4) for Sample H-1 without the quality of the image being deleteriously affected in a substantial manner and without appreciable deterioration of the magnetic heads.

The invention has been described in detail with particular reference to preferred embodiments thereof, but it will be understood that variations and modifications can be effected within the spirit and scope of the invention.

I claim:

1. In an element comprising a non-magnetic support and a magnetic recording layer having dispersed in a binder, (1) ferromagnetic particles and (2) non-ferromagnetic particles that improve the wear resistance of said layer and have a Mohs Hardness above that of said ferromagnetic particles, the improvement wherein said non-ferromagnetic particles consist essentially of a bimodal distribution of (a) particles and (b) particles, said (a) particles having an average particle size similar to or larger than that of the ferromagnetic particles in the range of about 0.3 to about 2 microns and being present in a concentration in the range of about 0.005 to about 0.025 parts, by weight, based on the weight of said ferromagnetic particles and said (b) particles having an average particle size up to about 0.1 micron and being present in a concentration in the range of about 0.02 to about 0.06 parts, by weight, based on the weight of said ferromagnetic particles.

2. The invention according to claim 1 in which the concentration of said (a) particles is in the range of about 0.01 to about 0.02 parts, by weight, and the concentration of said (b) particles is in the range of about 0.02 to about 0.04 parts, by weight.

3. The invention according to claim 2 in which said (a) particles have an average particle size in the range of about 0.3 to about 0.8 micron and said (b) particles have an average particle size in the range of about 0.001 to about 0.1 micron.

4. The invention according to claim 3 in which said ferromagnetic particles are acicular gamma ferric oxide particles and said non-ferromagnetic particles are alumina particles.

5. The invention according to claim 1 in which said Mohs Hardness is in the range of about 5.5 to about 10.

6. The invention according to claim 1 in which said ferromagnetic particles are iron oxide particles and said non-ferromagnetic particles have a Mohs Hardness in the range of about 7 to about 9.3.

7. The invention according to claim 6 in which said iron oxide particles are acicular gamma ferric oxide particles.

8. The invention according to claim 1 in which said (a) particles are alumina, silicon, silicon carbide, silicon nitride, boron carbide, boron nitride or chromium (III) oxide particles.

9. The invention according to claim 8 in which said (a) particles are alumina particles.

10. The invention according to claim 9 in which said (b) particles are alumina particles.

11. The invention according to claim 8 in which said (a) particles are silicon carbide particles.

12. The invention according to claim 8 in which said (b) particles are alumina particles.

13. The invention according to claim 12 in which said ferromagnetic particles are acicular gamma ferric oxide particles.

14. The invention according to claim 1 in which said ferromagnetic particles have an average particle size in the range of about 0.3 to about 0.7 micron.

15. The invention according to claim 14 in which said ferromagnetic particles are acicular gamma ferric oxide particles.

16. The invention according to claim 15 in which said (a) particles are alumina, silicon, silicon carbide, silicon nitride, boron carbide, boron nitride or chromium (III) oxide particles and said (b) particles are alumina particles.

17. The invention according to claim 1 in which said element comprises at least two superimposed magnetic recording layers and said magnetic recording layer of claim 1 is the outermost magnetic recording layer with respect to said non-magnetic support.

18. The invention of claim 1 in which said magnetic recording layer also comprises a carbonic acid ester lubricant.

19. The invention according to claim 18 in which said lubricant is ethyl cetyl carbonate.

* * * * *